US012055097B2

(12) United States Patent
Levisse et al.

(10) Patent No.: US 12,055,097 B2
(45) Date of Patent: Aug. 6, 2024

(54) DEVICE FOR CENTERING AND GUIDING A SHAFT OF AN AIRCRAFT TURBINE ENGINE

(71) Applicant: SAFRAN AIRCRAFT ENGINES, Paris (FR)

(72) Inventors: Paul Ghislain Albert Levisse, Moissy-Cramayel (FR); Emmanuel Fabrice Marie Baret, Moissy-Cramayel (FR); Julien Fabien Patrick Becoulet, Moissy-Cramayel (FR); Alexandre Jean-Marie Tan-Kim, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 18/549,796

(22) PCT Filed: Mar. 8, 2022

(86) PCT No.: PCT/FR2022/050410
§ 371 (c)(1),
(2) Date: Sep. 8, 2023

(87) PCT Pub. No.: WO2022/195193
PCT Pub. Date: Sep. 22, 2022

(65) Prior Publication Data
US 2024/0151182 A1 May 9, 2024

(30) Foreign Application Priority Data

Mar. 18, 2021 (FR) .......................................... 2102712

(51) Int. Cl.
*F02C 7/06* (2006.01)
*F01D 25/16* (2006.01)

(52) U.S. Cl.
CPC .............. *F02C 7/06* (2013.01); *F01D 25/162* (2013.01); *F05D 2240/50* (2013.01); *F05D 2260/96* (2013.01)

(58) Field of Classification Search
CPC ........ F01D 25/162; F01D 25/164; F02C 7/06; F04D 29/059; F04D 29/668;
(Continued)

(56) References Cited

U.S. PATENT DOCUMENTS 3,709,570 A * 1/1973 Galbato .................. F16C 27/04
384/536
5,054,938 A * 10/1991 Ide ....................... F16F 15/0237
384/119
(Continued)

FOREIGN PATENT DOCUMENTS

DE 102012221369 A1 5/2014
DE 102017100571 A1 3/2018
(Continued)

OTHER PUBLICATIONS

International Search Report received for PCT Patent Application No. PCT/FR2022/050410, mailed on Apr. 28, 2022, 8 pages (3 pages of English Translation and 5 pages of Original Document).

*Primary Examiner* — Jesse S Bogue
(74) *Attorney, Agent, or Firm* — WOMBLE BOND DICKINSON (US) LLP

(57) ABSTRACT

A device for centering and guiding a shaft of an aircraft turbine engine, the device including an outer ring of a rolling bearing, the ring extending about an axis; an annular bearing support extending about the axis and at least partially about the ring; at least one series of connecting elements for linking the ring to the support, the connecting elements being interposed between an inner cylindrical rim of the ring and an outer cylindrical rim of the support that extends about the inner rim, and each having a first radially outer end for linking to the outer cylindrical rim and a second radially inner end for linking to the inner cylindrical rim, the ring, the support and the connecting elements being integrally
(Continued)

formed, the connecting elements being enclosed in an annular housing that is radially delimited by the rims and laterally enclosed by an annular web.

9 Claims, 3 Drawing Sheets

(58) Field of Classification Search
CPC ............. F05D 2240/50; F05D 2240/54; F05D 2250/75; F05D 2260/96; F16C 19/26; F16C 2360/23; F16C 27/04; F16C 27/045; F16F 15/0237; Y02T 50/60
See application file for complete search history.

(56) References Cited

U.S. PATENT DOCUMENTS

| | | | |
|---|---|---|---|
| 5,380,100 A | | 1/1995 | Yu |
| 5,513,917 A | * | 5/1996 | Ide ........................ F16C 17/03 |
| | | | 384/100 |
| 6,224,533 B1 | * | 5/2001 | Bengtsson ............. F16C 27/04 |
| | | | 384/535 |
| 8,083,413 B2 | * | 12/2011 | Ertas .................. F16C 32/0603 |
| | | | 384/312 |
| 8,182,153 B2 | * | 5/2012 | Singh .................... F16C 27/066 |
| | | | 384/477 |
| 9,677,659 B1 | * | 6/2017 | Niergarth ............ F16H 57/0006 |
| 10,450,893 B1 | * | 10/2019 | Polly .................... F16C 33/7816 |
| 10,753,391 B1 | | 8/2020 | Smedresman |
| 10,794,222 B1 | | 10/2020 | Ganiger et al. |
| 11,220,927 B2 | * | 1/2022 | Laroche .................. F01D 25/18 |
| 2015/0233293 A1 | | 8/2015 | Grogg |
| 2015/0316095 A1 | | 11/2015 | Bedenk et al. |
| 2020/0408109 A1 | | 12/2020 | Hallouin et al. |

FOREIGN PATENT DOCUMENTS

| | | |
|---|---|---|
| DE | 102017100572 A1 | 3/2018 |
| FR | 3009843 A1 | 2/2015 |
| FR | 3078370 A1 | 8/2019 |
| FR | 3096072 A1 | 11/2020 |

\* cited by examiner

DEVICE FOR CENTERING AND GUIDING A SHAFT OF AN AIRCRAFT TURBINE ENGINE

TECHNICAL FIELD OF THE INVENTION

This invention relates to a device for centring and guiding an aircraft turbine engine shaft.

TECHNICAL BACKGROUND

An aircraft turbine engine comprises shafts, such as a low-pressure shaft and a high-pressure shaft, which are centred and guided in rotation by bearings, generally rolling bearing, for example roller or ball bearings.

A rolling bearing comprises outer and inner rings between which the rollers or the balls are arranged. The inner ring is secured to the shaft to be guided and the outer ring is attached to a bearing support which is a rigid part of the turbine engine stator.

A turbine engine shaft can reach a very high speeds, typically between 2,000 and 30,000 rpm. Such speeds induce excitations of the eigen-modes of the shafts, which can have harmful effects on the engine if the mode responds strongly.

In order to control the position of the mode, the bearings are usually combined with flexible cages that allow the boundary conditions of the shaft to be relaxed and lower the frequency of the eigen-mode. The mode, less high in speed, responds less strongly.

In this application, "flexible cage" means a member or an assembly that provides a flexible connection between the outer ring of a bearing and its support. The flexibility of this cage is generally ensured by a capacity for elastic deformation of this cage, for example in torsion and/or bending. To provide this capability, the cage comprises at least one series of studs distributed around the axis of the bearing and extending substantially parallel to this axis.

There are currently two flexible cage technologies for bearings.

The first technology described in the documents FR-A1-3 009 843 and FR-A1-3 078 370 is a monobloc flexible cage. A cage of this type generally comprises an inner cylindrical wall to which the outer ring of the bearing is attached or integrated, and an outer cylindrical wall or an attachment flange for attaching to the bearing support. The walls are connected by a series of generally C-shaped or L-shaped studs, or by two series of studs extending around each other and connected together. The studs and the walls are then formed from a single piece.

A second technology described in the document FR-A1-3 009 843 concerns a cage obtained by assembling independent studs with the support and the ring. Each stud comprises an elongated body and connected at a first longitudinal attachment end for attaching to the support and at a second longitudinal attachment end for attaching to the ring. The cross-sectional shape of the body is circular, i.e. axisymmetric (the cross-sectional shape of the body of the stud is symmetrical with respect to the longitudinal axis of this body). The flexible cage equipped with these studs also has an axisymmetric shape and its stiffness is identical whatever the transverse direction of the load forces of the cage.

The prior art also comprises technologies described by US-B1-10 794 222, DE-A4-10 2017 100572, FR-A1-3 096 072 or DE-A1-10 2012 221369.

The invention proposes an improvement to these technologies, which in particular allows to adapt the stiffness of the flexible cage as a function of the direction of load.

SUMMARY OF THE INVENTION

The invention proposes a device for centring and guiding an aircraft turbine engine shaft, this device comprising:
- an outer ring of a rolling bearing, this ring extending around an axis,
- an annular bearing support extending around the axis and at least partly around the ring,
- at least one series of connecting elements for connecting the ring to the support, these elements being elastically deformable and distributed around the axis with an inclination relative to a radial direction which is specific to each element, the connecting elements being interposed between an inner cylindrical rim of the ring and an outer cylindrical rim of the support which extends around said inner rim and each comprising a first radially outer end for connecting to said outer cylindrical rim and a second radially inner end for connecting to said inner cylindrical rim,
- the ring, the support and the connecting elements being formed in a single piece,
- characterised in that the connecting elements are enclosed in an annular housing delimited radially by the rims, the annular housing being closed laterally by an elastically deformable annular web which connects the rims and is formed in a single piece with the ring and the support.

The ring, the support and the connecting elements are formed from a single piece, for example by additive manufacturing. This allows to simplify the manufacture of the device by eliminating assembly and adjustment steps. The distribution of the connecting elements around the device and their inclination with respect to a radial direction which is specific to each of the elements allows the stiffness of the device to be adjusted in the aforementioned directions.

A device in the prior art equipped with studs with axisymmetric bodies has the same stiffness in all the transverse directions (perpendicular to the axis), regardless of the position of the studs around their respective axes. This means that the stiffness of the device in a first direction perpendicular to the axis (for example in a horizontal plane) is identical to the stiffness of the device in a second direction perpendicular to the axis (for example in a vertical plane).

In contrast, the invention allows the device to be given different stiffnesses depending on the transverse directions of load. Advantageously, the device comprises at least two different stiffnesses in directions transverse with respect to the axis of the shaft. To stabilise a shaft, it is particularly useful to provide different stiffnesses in two transverse directions that are perpendicular to each other, as this allows to reduce the speed at which instabilities appear in the shaft guided by the device.

The device according to the invention may comprise one or more of the characteristics below, taken alone with each other or in combination with each other:
- the outer ring comprises an outer cylindrical surface defining with an inner cylindrical surface of the support an annular space for forming a damping oil film;
- the connecting elements are located at one axial end of the annular space and are located on a circumference having a diameter substantially equal to the diameter of this space;

the connecting elements are distributed around the axis with a regular and/or irregular pitch;

the connecting elements are formed by blades;

the blades have a generally corrugated shape;

the blades are each generally S-shaped;

the web is generally bellows-shaped;

a first series of blades and a first web are located at one axial end of the device, and a second series of blades and a second web are located at an opposite axial end of the device;

the first and second webs form lateral seals for the annular space, the support comprising at least one supply orifice and at least one orifice for evacuating oil from this space.

The invention also relates to an aircraft turbine engine, comprising at least one device as described above.

BRIEF DESCRIPTION OF THE FIGURES

Further characteristics and advantages of the invention will become apparent from the following detailed description, for the understanding of which reference is made to the attached drawings in which.

DETAILED DESCRIPTION OF THE INVENTION

Figure 1:
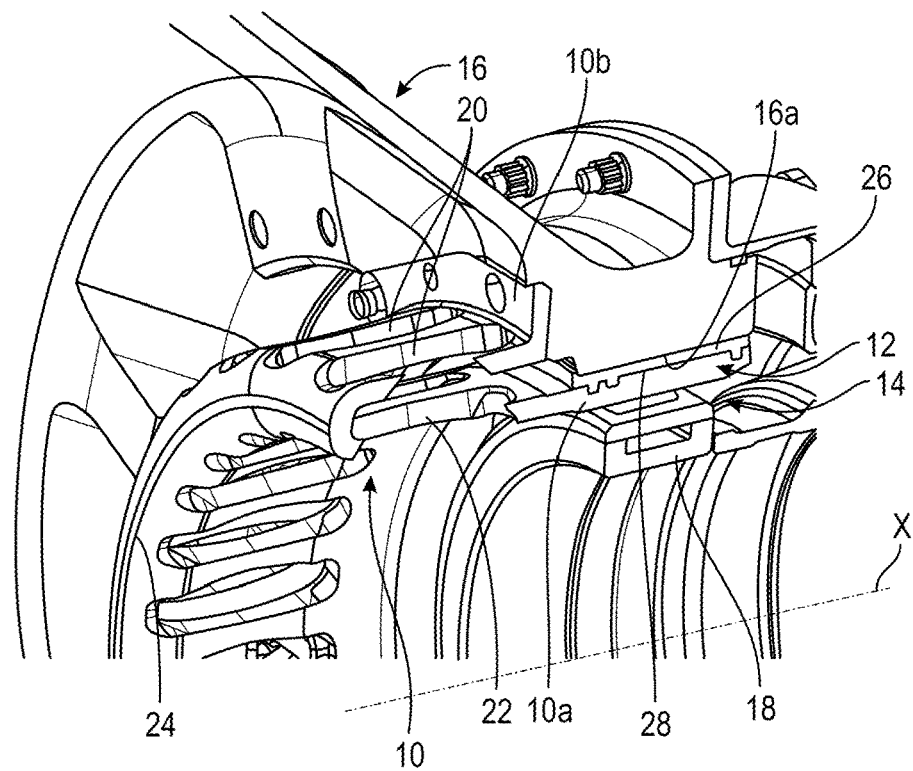
FIG. 1 is a schematic axial cross-section and perspective view of a device for guiding and centring an aircraft turbine engine bearing, according to prior technology.

Reference is first made to FIG. 1, which shows a first monobloc flexible cage technology 10 according to the prior art.

The flexible cage 10 ensures the connection of an outer ring 12 of a rolling bearing 14 to an annular support 16 of this bearing 14.

In addition to the outer ring 12, the bearing 14 comprises an inner ring 18 which is secured to a shaft of the turbine engine, which is not shown. The rings 12, 18 define a roller raceway in the example shown.

The outer ring 12 is integrated into an inner cylindrical wall 10a of the cage 10, which comprises a radially outer annular flange 10b for attaching to the support 16 by screw-nut type means (not shown).

The cage 10 comprises two series of studs 20, 22, radially inner and outer respectively in relation to the axis X of the bearing 14 and of the shaft it guides. The axis X corresponds to the engine axis of the turbine engine.

The studs 20, 22 are distributed around the axis X and extend parallel to this axis. The studs 20 extend around the studs 22 and have a first of their longitudinal ends which is connected to the flange 10b, and a second of their longitudinal ends which is connected to the other studs 22 by an annular segment 24 with a C-shaped cross-section of the cage 10. The studs 22 extend from the wall 10a, in line with it, to this segment 24.

The support 16 forms part of a stator of the turbine engine and here has a substantially frustoconical general shape. At its inner periphery, it comprises an inner cylindrical surface 16a for shrink-fitting an annulus 26 which extends around the wall 10a of the cage and which defines with the latter an annular space 28 supplied with oil in order to form an oil film for damping the vibrations transmitted by the bearing 14 during operation.

In this type of technology, the stiffness of the cage 10 and of the bearing 14 is the same in all transverse directions (perpendicular to the axis X).

However, from a dynamic point of view, it can be interesting to have different stiffnesses in two orthogonal directions: this provides a stabilising effect to the device by delaying the speed of appearance of instabilities due to the inner damping of the shaft.

In fact, by creating different flexibilities in at least two directions, at least two modes appear, as opposed to a single mode in the axisymmetric case.

In the case where the initial radial stiffness of the axisymmetric cage K is such that K1<K<K2 where K1 and K2 are the stiffnesses of the asymmetric flexible cage respectively in the different directions 1 and 2 transverse to the axis X, then the frequencies of the modes created will be within the frequency of the initial single mode.

In this case, the frequency with which instabilities can occur is increased, thereby allowing to limit the risk of potentially damaging instability for the engine.

The control of the movement of the shaft in azimuth can also be used to improve the performance of the engine. Under mechanical or thermal loading, the engine enclosure deforms, and these distortions generate different clearance openings and closures depending on the azimuth. This implies a degradation in the engine performance which could be limited if the dynamic displacement is optimised to compensate for some of the distortion, for example by stiffening the flexible cage in the direction of clearance closure and softening it in the direction of the clearance opening.

The present invention allows to meet this need by means of connecting elements for connecting the ring 12 to the support 16, which are formed in a single piece with the ring and the support.

Figure 2:
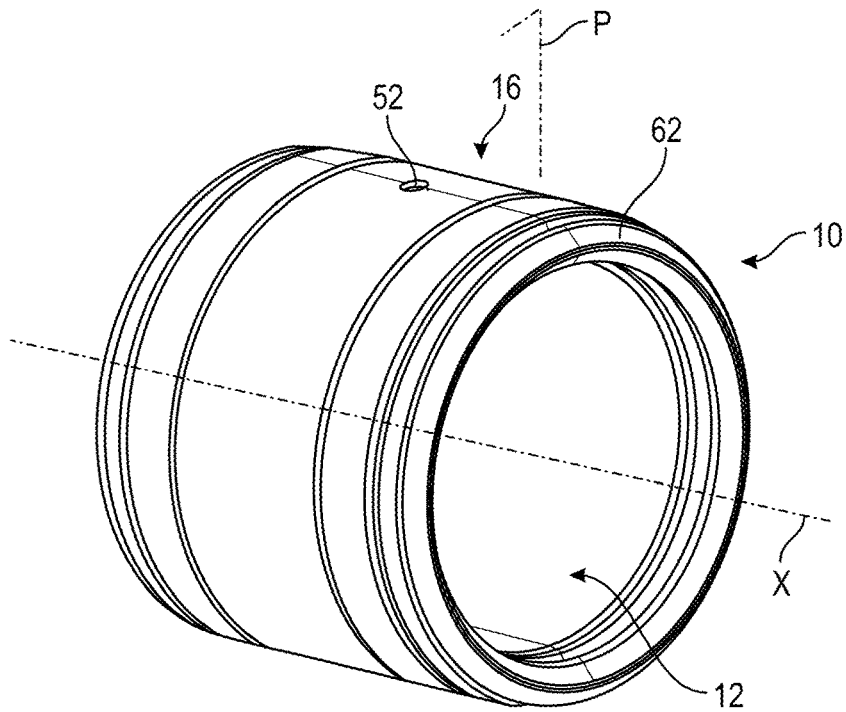
FIG. 2 is a schematic perspective view of a device for guiding and centring an aircraft turbine engine bearing according to one embodiment of the invention.
Figure 3:
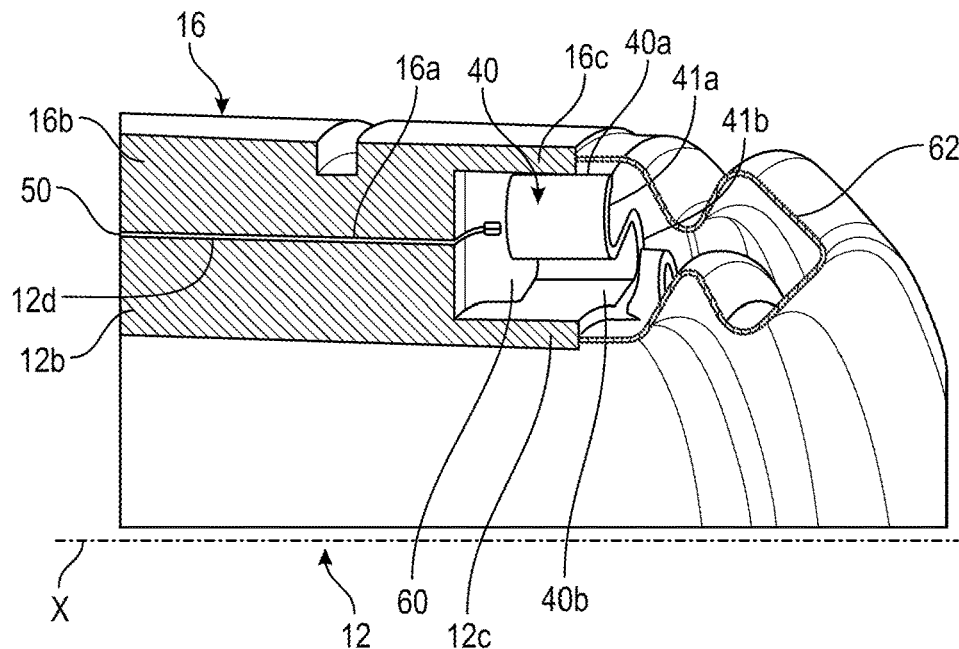
FIG. 3 is a schematic cross-sectional half-view of FIG. 2.
Figure 4:
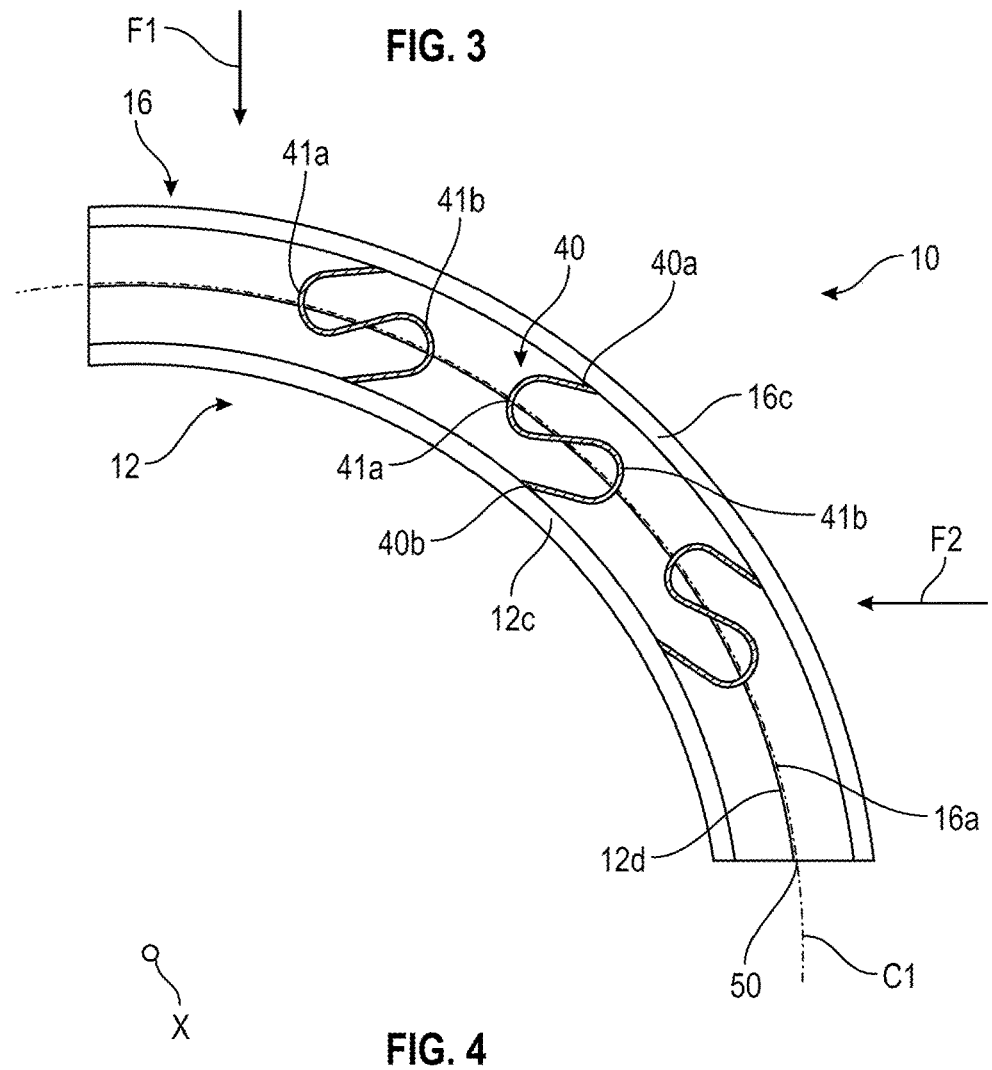
FIG. 4 is a very schematic cross-sectional view of FIG. 3.

FIGS. 2 to 4 illustrate an embodiment of a device, according to the invention, for centring and guiding an aircraft turbine engine shaft. The device is symmetrical with respect to a median plane P perpendicular to an axis X, as shown in FIG. 2. This means that the device comprises two identical axial ends. In other words, what is described below for one axial end of the device also applies to the other axial end, opposite the first.

The device comprises:

an outer ring 12 of a rolling bearing, this ring 12 extending around an axis X, an annular bearing support 16 extending around the axis X and at least partly around the ring 12, and at least one series of connecting elements 40 for connecting the ring 12 to the support 16, these elements 40 being distributed around the axis X and each comprising a first end 40a for connecting to the support 16 and a second end 40b for connecting to the ring 12.

The ring 12, the support 16 and the connecting elements 40 are formed from a single piece. In other words, the device is monobloc. Unlike the flexible cage 10 of the prior technology, where only the studs 20, 22, the wall 10a and the flange 10b are formed in a single piece, the support 16 is also formed in a single piece with the ring 12 and the elements 40.

The outer ring 12 comprises a cylindrical portion 12b which comprises at its outer periphery an outer cylindrical surface 12d defining with the support 16 an annular space 50 for forming a damping oil film. The ring 12 also comprises, at each of its ends, an inner cylindrical rim 12c extending in the axial extension of the cylindrical portion 12b. Inner cylindrical rim 12c is understood to mean a rim which extends, in the axial extension of the ring 12, as close as possible to the axis X. The thickness of the rim 12c is less than the thickness of the cylindrical portion 12b of the ring 12.

The support 16 comprises a cylindrical portion 16b which extends at least partly around the cylindrical portion 12b of the ring 12. The cylindrical portion 16b comprises at its inner periphery an inner cylindrical surface 16a defining with the outer cylindrical surface 12d the aforementioned annular space 50 for forming a damping oil film.

The support 16 comprises at least one oil supply orifice 52 and at least one oil evacuation orifice, each of these orifices communicating with the annular space 50. These orifices are located on the outer periphery of the cylindrical portion 16b. The supply orifice 52 can open into a first annular gorge, not visible here, which ensures an even distribution of oil in the annular space 50. In the case where several supply orifices 52 are present, several first annular gorges ensure the distribution of the oil.

The support 16 also comprises at each of its ends an outer cylindrical rim 16c which extends in the axial extension of the cylindrical portion 16b, and which extends around the inner rim 12c. An outer cylindrical rim 16c is understood to mean a rim which extends, in the axial extension of the support 16, as far as possible from the axis X. The thickness of the rim 16c is less than the thickness of the cylindrical portion of the support 16.

Furthermore, the inner cylindrical rim 12c may be referred to as the first cylindrical rim 12c and the outer cylindrical rim 16c may be referred to as the second cylindrical rim 16c.

The connecting elements 40 are located at one axial end of the annular space 50. They are located on a circumference C1 having a diameter substantially equal to the diameter of the space 50. This means that the geometric centre of each of the elements 40 lies on this circumference C1. It is understood that a portion of the shape of the element 40 may lie outside this circumference C1, in other words a portion of the element 40 may lie on a circumference with a diameter substantially greater or less than the diameter of the circumference C1.

In the example shown here, the connecting elements 40 are elastically deformable and can be formed by blades, which are themselves elastically deformable. A blade is defined as a strip that is thin and long, with a thickness less than its width, width which extends in a direction substantially parallel to the axis X. The blades are interposed between the inner cylindrical rim 12c of the ring 12 and the outer cylindrical rim 16c of the support 16. In particular, each of the blades is connected to the rim 16c of the support 16 by its first, radially outer end 40a, and to the rim 12c of the ring 12 by its second, radially inner end 40b.

The connecting elements 40 are enclosed in an annular housing 60. This housing 60 is delimited radially by the inner cylindrical rim 12c and the outer cylindrical rim 16c, and is closed laterally by the combined allowance of the cylindrical portions 12b, 16b, between which the annular space 50 extends, and by an annular web 62. A web 62 is understood to be a thin wall, in particular the thickness of the web 62 is less than the thickness of the rims 12c, 16c which it joins by being formed in a single piece with the ring 12 and the support 16. The web 62 is elastically deformable and can take on a corrugated shape in the radial direction. The web 62 can, for example, take the general shape of a bellows or be Ω-shaped in cross-section.

This shape allows the web 62 to absorb the relative displacements between the ring 12 and the support 16 in an axial direction. The web 62 also has the advantage of providing a lateral sealing for the annular space 50 where the damping oil film is formed.

As the web 62 is in one piece with the ring 12 and the support 16, the oil cannot escape laterally from the device.

It is understood that the housing 60 may contain oil from the annular space 50. In other words, the connecting elements 40 can be immersed in oil.

At least one oil evacuation hole, not shown, may be present in the housing 60. This hole is calibrated so as to evacuate the oil from the housing 60 at a flow rate equivalent to the oil flow rate required to form the damping oil film in the annular space 50. In addition, to ensure a better evacuation, the holes can open into a second annular gorge.

In a variant not shown here, annular segments axially delimit the annular space 50. It is understood that only the annular space 50 contains oil. Each segment comprises a leak calibrated so as to evacuate the oil from the annular space 50 at a flow rate substantially lower than the supply flow rate to the annular space 50. This leak is calibrated to have a flow rate that is substantially lower than the evacuation flow rate through the evacuation hole in the housing 60. The oil is evacuated via a low-level outlet.

In the example shown in FIGS. 3 and 4, the blades each have a general "S" shape. Such a shape has the advantage of having curvatures 41a, 41b at the level of the ends 40a, 40b of the blade. A first curvature 41a, at the level of the first end 40a, is oriented in a first orientation, and a second curvature 41b, at the level of the second end 40b, is oriented in a second orientation, opposite to the first.

An "S" shape also has the advantage of having a centre of symmetry. This centre of symmetry corresponds to the geometric centre of the shape and is located approximately on the circumference C1. In this way, a first junction between the first end 40a and the support 16 is symmetrical, with respect to this centre of symmetry, to a second junction between the second end 40b and the ring 12. In addition, the first junction, the second junction and the centre of symmetry, located in the same plane, are radially aligned with the centre of the device through which the axis X passes.

Another advantage of the "5" shape is that it gives the elements 40 at least two different stiffnesses depending on the direction of the load. In fact, with a load referred to as vertical load, i.e. in a direction tangential to the curvatures 41a, 41b, the elements 40 can deform. The curvatures 41a, 41b ensure the flexibility of the elements 40. With a load referred to as horizontal load, perpendicular to the vertical load, the elements 40 do not deform.

This "5" shape is not restrictive and the blades can adopt any shape offering a different stiffness in two directions in a plane orthogonal to the axis of rotation of the engine shaft, in other words the axis X.

The connecting elements 40, or blades, are arranged around the axis X. They can be distributed with a regular pitch, i.e. the distance between two consecutive elements 40 is identical. They can also be distributed with an irregular pitch, i.e. the distance between the elements 40 can vary. In a non-limiting example, there may be a first set of elements 40, spaced apart from each other by the same distance or the same pitch, and a second set of elements 40, spaced apart from each other by the same distance but spaced from the first set by a different distance. This means that the pitch between the elements 40 can be regular and/or irregular.

The device can be produced by additive manufacturing. This can be a metal additive manufacturing, by powder sintering for example. As the device can comprise elements 40 with a particular conformation, this technique allows, among other things, a simplified production of the device, by eliminating assembly and adjustment steps. In addition, this means that the configuration of the parts can be changed easily and quickly during the development phase.

FIG. 4 shows a cross-section of a segment of the device. A set of elements 40 is distributed around the axis X. It is understood that the cage 10 is not axisymmetric with respect to the axis X and its stiffness is not axisymmetric either. Each of the elements 40 is arranged at a given angle with respect to the radial direction. In other words, each element 40 has its own inclination with respect to the radial direction. In this way, an overall stiffness is obtained when the device is loaded in a first direction (arrow F1), or in a second direction (arrow F2) orthogonal to the first direction. The first direction may, for example, be vertical and the second direction, orthogonal to the first, may, for example, be horizontal. Thanks to this given inclination, it is understood that each element 40 deforms differently according to the loads F1 or F2, and has its own specific stiffness. In this way, all the elements 40 work together, allowing to limit the concentration of stresses.

Figure 5:
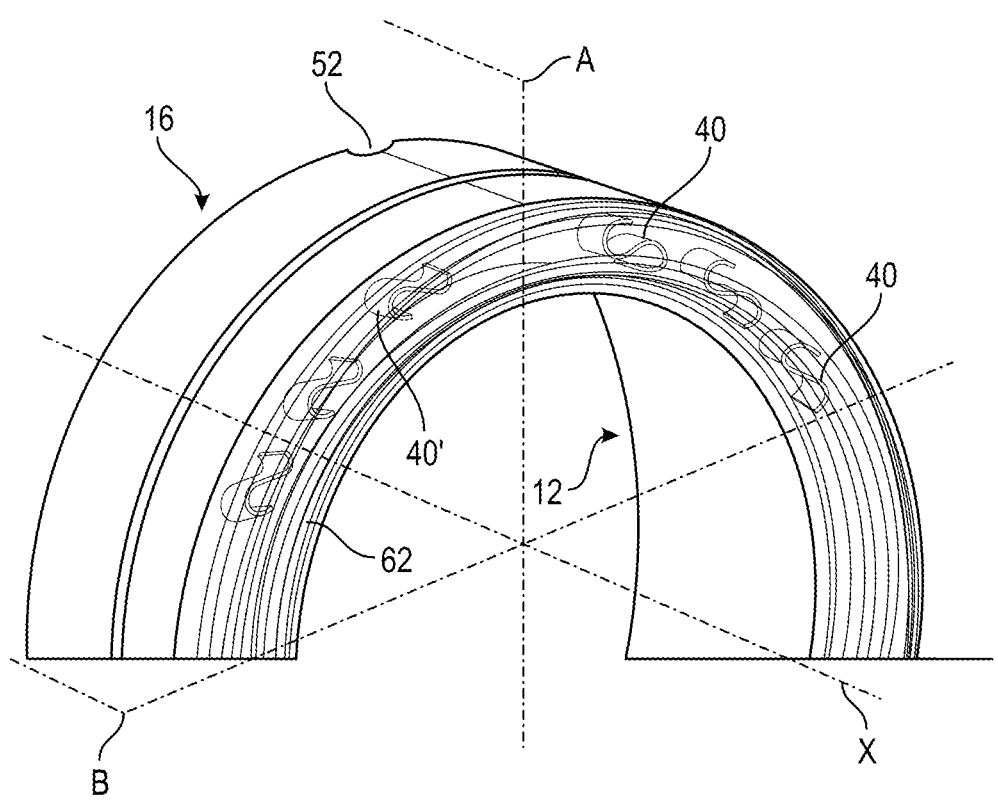
FIG. 5 is a schematic perspective view of a device for guiding and centring an aircraft turbine engine bearing according to another embodiment of the invention, showing an axial end of the device in transparent view.

FIG. 5 illustrates another example of embodiment of the device. In this example, the device is similar to that described above. It comprises a first set of elements 40 and a second set of elements 40'. The second set of elements 40' is symmetrical to the first set of elements 40 with respect to a plane of symmetry A. The device may also comprise, although not shown here, two other sets of elements 40, 40': a third set of elements 40' and a fourth set of elements 40. The third set of elements 40' can be positioned opposite the first set of elements 40 with respect to a plane B of symmetry. We understand that this third set is identical to the second set. The fourth set of elements 40 can be positioned opposite the second set of elements 40' with respect to the plane B, the fourth set being symmetrical to the second set. It is understood that the fourth set is also symmetrical to the third set with respect to the plane A and it is also understood that the fourth set is identical to the first set of elements 40.

A first given pitch separates the elements 40, 40' for each set of elements 40, 40'. It is clear that this first pitch is identical for each set. A second pitch, different from the first pitch, separates each set. This second pitch may be smaller or larger than the first pitch.

The invention also relates to an aircraft turbine engine comprising at least one device as described above.

The device and the flexible cage according to the invention are therefore advantageous in that the stiffness of the cage differs according to the angular position of the force transmitted to the cage in a direction transverse to its main axis.

To stabilise a shaft, it is particularly useful to provide different stiffnesses in different transverse directions, as this allows to reduce the speed at which instabilities appear in the shaft guided by the device.

The invention claimed is:

1. A device for centering and guiding an aircraft turbine engine shaft, this device comprising:
   an outer ring of a rolling bearing, this ring extending around an axis,
   an annular bearing support extending around the axis and at least partly around the ring,
   at least one series of connecting elements for connecting the ring to the support, these elements being elastically deformable and distributed around the axis with an inclination relative to a radial direction which is specific to each element, said connecting elements being interposed between an inner cylindrical rim of the ring and an outer cylindrical rim of the support which extends around said inner rim and each comprising a first radially outer end for connecting to said outer cylindrical rim and a second radially inner end for connecting to said inner cylindrical rim,
   the ring, the support and the connecting elements being formed in a single piece,
   wherein the connecting elements are enclosed in an annular housing delimited radially by said rims, said annular housing being closed laterally by an elastically deformable annular web connecting said rims and being formed in a single piece with the ring and the support.

2. The device according to claim 1, wherein the outer ring comprises an outer cylindrical surface defining with an inner cylindrical surface of the support an annular space for forming a damping oil film.

3. The device according to claim 2, wherein the connecting elements are located at an axial end of said space and are located on a circumference having a diameter substantially equal to the diameter of said space.

4. The device according to claim 1, wherein the connecting elements are formed by blades.

5. The device according to claim 4, wherein the blades are each generally S-shaped.

6. The device according to claim 4, wherein a first series of blades and a first web are located at one axial end of the device, and a second series of blades and a second web are located at an opposite axial end of the device.

7. The device according to claim 6, dependent on claim 2 or 3, said first and second webs form lateral seals for said space, the support comprising at least one supply orifice and at least one orifice for evacuating oil from this space.

8. The device according to claim 1, wherein the web is generally bellows-shaped.

9. An aircraft turbine engine, comprising at least one device according to one of the preceding claims.

\* \* \* \* \*